United States Patent

[11] 3,559,853

[72] Inventor Robert H. Strassman
 147-11 34th Ave., Flushing, N.Y. 11354
[21] Appl. No. 815,813
[22] Filed Apr. 14, 1969
[45] Patented Feb. 2, 1971

[54] CAMERA STRAP WITH FREE-FLOATING LOOPS AT BOTH ENDS
 4 Claims, 6 Drawing Figs.
[52] U.S. Cl. .................................................. 224/5
[51] Int. Cl. .................................................. A45f 5/00
[50] Field of Search .................................... 224/1.1,
 5.2, 5.9, 5.19, 5.21, 5; 350/72, 298; 95/86

[56] References Cited
UNITED STATES PATENTS
1,208,728 12/1916 Bartlett et al. ................ 224/5
3,152,738 10/1964 Worsfold ..................... 224/5(ZZ)

Primary Examiner—Robert G. Sheridan
Attorney—Julius E. Foster

ABSTRACT: A camera shoulder strap provided at each end with a loop having attached thereto a snap clip provided with a fully rotatable head, to permit free and easy complete rotary self-positioning of the clip as attached respectively to two separate side brackets of a camera, to permit an immediate fast positioning of a camera from supported position on the shoulder, to operating position in front of the body, without restraint due to usual twisting of the shoulder strap.

PATENTED FEB 2 1971 3,559,853
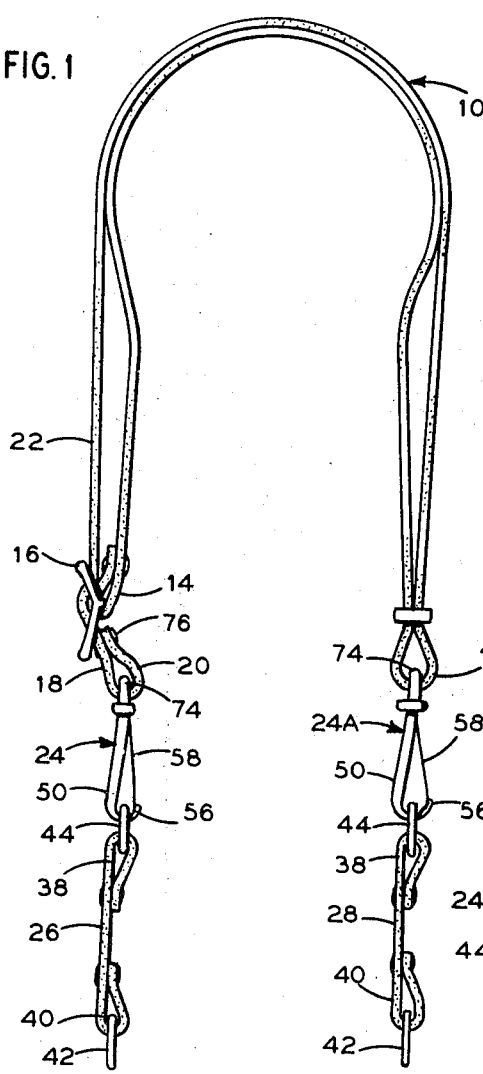
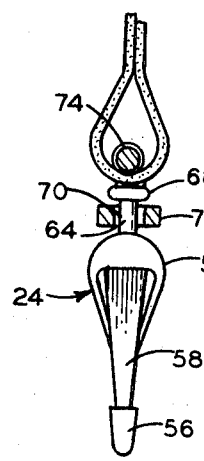
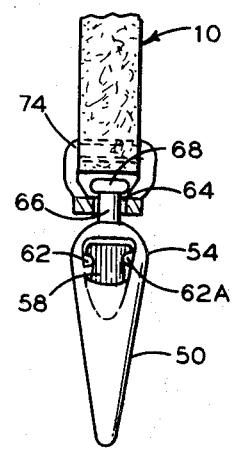
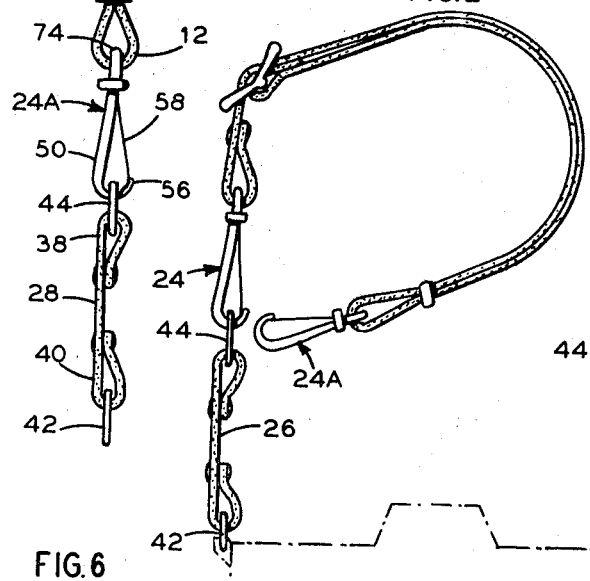
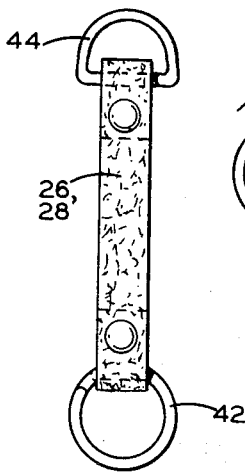
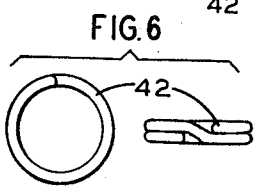
INVENTOR.
Robert H. Strassman
BY
ATTORNEY

CAMERA STRAP WITH FREE-FLOATING LOOPS AT BOTH ENDS

This invention relates to cameras straps, and particularly to a strap with free floating loops at both ends of the strap to provide maximum free articulation at the end of the strap that will permit a camera supported from the shoulder by such strap to be swung quickly into operative picture-taking position with zero or minimum restraint on the camera.

One of the disadvantages found in current conventional shoulder straps for cameras is that the connection to the camera at one end of the strap, or at both ends of the strap, may be relatively fixed, and have little or no self-adjusting freedom when the camera is moved from rest position to operative position.

As a result when a camera is supported by such a strap on a person's shoulder and it is desired to move the camera quickly into desired picture taking position, the relatively fixed connection between one end of the strap and the camera causes a certain amount of twisting in the strap from the point at which the fixed connection exists at the camera. The twist of the camera strap introduces a discomfort to the person, with a consequent instability in supporting the camera, and with increase in the time taken to readjust the camera to a more comfortable support position of the camera. Precious time is thus lost in a situation where the event or occurrence to be photographed by the camera is a quickly transient one.

By the provision of a flexible self-adjusting connection between each end of the strap and the camera, that permits each end of the strap to adjust itself freely, I have found that a camera supported from a strap on the shoulder may be swung quickly from a back supported position to a front working position, quickly and without any distortion or disturbance on the strap, such as twisting of a kind that would make the strap supporting action unstable and introduce difficulties in focusing the camera for a quick shot.

To provide for such flexibility in the connection to the camera, a screw type terminal is employed to fit into a socket that is usually provided in the camera housing and the terminal is provided with a bail connection that is shaped to have full free rotation around the longitudinal axis of the terminal, and free angular turning movement about a connection between the bail and the strap.

Thus, when a camera is swung from a supported position on the back of the person, quickly to the front, both ends of the strap adjust themselves with any necessary angular or rotary movement to permit the camera, as held, to be freely moved without any restraint from twisting of the strap, as occurs in conventional straps, in which one end of the strap or both ends may act free to adjust to a relatively free unstressed position.

The construction of the strap, and the manner in which it is secured to the camera and operated on the shoulder of the person, are more fully described in the following specification and in the accompanying drawings, in which:

FIG. 1 is a front elevational view of the strap in normal supporting position;

FIG. 2 is a front elevational view of a camera with the supporting strap of FIG. 1 shown attached to the camera at one side;

FIG. 3 is a side elevational view of a fully rotatable snap clip, shown partially in section on the strap loop;

FIG. 4 is a side elevational view of the snap clip and strap shown in FIG. 3;

FIG. 5 is an elevational view of an auxiliary strap with double loop for securing the strap to a camera and serving to receive one end of the shoulder strap and FIG. 6 is a front elevational and a side elevational view of a helical ring normally secured to a camera bracket and connected to one end of the auxiliary strap.

As shown in FIG. 1, a shoulder strap 10, consisting of an elongated strip of material such as leather, fabric or the like, shown folded at a midloop 12 to serve as one end of a shoulder strap, and with one end of the strip coupled to a buckle 16 with the other end of the strip 18 interlaced with the buckle 16 and formed into a completed end loop 20 The two loops 12 and 20 serve as the two supporting end loops of the shoulder strap, whose effective lengthening can be adjustably varied by shifting the position of the buckle 16 on the strip 22 of the strap. Two similar snap clips 24 and 24A are mounted on the respective loops 12 and 20 of the shoulder strap, and serve to provide quickly attachable and detachable means for connection to auxiliary coupling straps 26 and 28, that are provided for attachment to suitable brackets 30 for threaded coupling into threaded sockets on opposite sides of the camera frame 36 that is to be supported from a shoulder strap.

The auxiliary straps 26 and 28 conventionally respectively consist of a strap of suitable material which may be metal or fabric appropriately folded to provide two end loops 38 and 40. The lower loop 40 carries a helical supporting ring 42 connected to the threaded bracket 30, and the upper loop 38 carries a ring 44 to serve as the receiving or coupling loop for a snap clip 24 at either end of the shoulder strap.

When a camera is carried on a person's shoulder with a conventional camera strap, both ends of which are relatively fixed in relation to the camera, any quick movement of the camera from its supported position on the shoulder to an operable picture-taking position, at the front of the body, to take a sudden picture shot, is attended by a twist in the strap that introduces a difficulty, although slight, in positioning the camera, with the result that a small increment of time has been lost in the positioning of the camera. Consequently, in many instances a desired picture shot is lost because of the difficulty in positioning the camera quickly due to the interference of the twisting action in the supporting strap.

By providing a freely self-adjustable supporting and coupling connection for each side of the camera, at each end of the strap, there is no tendency in the strap to become twisted, since the coupling clips that are free to rotate at the ends of the strap will immediately adjust themselves to permit free turning movement of the coupling to the camera, for quick positioning at any desired position at the front of the body.

As a result of the immediate self-adjusting movement of the supporting clips at both ends of the strap, as disclosed and employed herein, the positioning movement to bring the camera from the back of the body to the front of the body can be accomplished in a shorter time because of the absence of the interference and time delay from a twisting strap.

To provide such immediate self-adjustment at the ends of the strap, a self-adjusting freely rotatable snap clip 50 is employed, the construction of which is shown in FIGS. 3 and 4.

As there shown, a snap clip embodies a J-shaped bracket 52 having an upper head portion 54 and a lower J-loop 56 with a spring blade 58 supported on the head 54 to be operated as a cantilever supported at one end 60. As shown, the head 54 has two laterally positioned side lugs 62 and 62A formed on the inner surface of the head 54. The free end of the cantilever spring 58 is resiliently pressed against the smaller J-loop of the clip bracket 50 to prevent unwanted separation of the upper ring 44 from the bracket 50. As is well known, the resiliency of the spring 58 will press its lower or free end against the inner surface of the J-loop to keep the bracket 50 closed. The ring 44 on the auxiliary coupling strap 28 may be freely coupled onto the snap clip 50 by pulling the ring 44 downward and inward against the spring 58. Inversely, the ring 44 may be removed from the snap spring clip 50 by first pressing the spring 58 inward and then sliding the ring 44 out past the end of the resilient spring 58.

As shown in FIGS. 3 and 4, the head 54 of the snap clips 50 has an integrally formed extension boss 64 having a symmetrical cylindrical shank 66 terminating in an enlarged head 68. The boss 64 extends through a coaxial opening 70 in a ring 72 that is integral with a bail 74 which serves as a loop for free sliding connection on the strap 10.

In assembling the entire strap the two bail loops 74 of the two snap spring clips 50 are fitted onto the strap 22, after which the bail of element 24 is secured in place by closing loop 20 with suitable clamping means such as sewing or metal clamping 76, while the other snap spring clip 24A is left free on the strap to be adjustably positionable to and on an intermediate loop 12 formed in the strap, according to any adjustment that may be made in the length of the shoulder strap by adjusting the buckle 16.

Thus, by the position of the two free self-adjusting snap spring clips 24 and 24A, at the active ends of the shoulder strap, as shown in FIGS. 1 and 2, the connecting elements between the two loops of the strap and the camera, as shown in FIG. 2, provide any rotary adjustment necessary to enable the camera to be swung into another plane quickly without disturbing the normal lay of the strap on the shoulder and without introducing into the strap any twisting force which might otherwise interfere with the immediate quick positioning of the ends of the strap and of the camera where a quick camera shot is desired.

The invention is not restricted to the details of construction shown, nor to the specific construction of the spring clips, since any clips will serve to provide the function herein so long as such clips embody a function that will permit relatively quick and free self-adjustment around a relatively vertical supporting axis, to enable the camera to be shifted with respect to the strap, without imposing a twisting action on the strap as the camera is shifted from a normal rest position to a desired picture-taking position.

I claim:

1. A shoulder strap for a camera, comprising:

an elongated strip of flexible material having a closed loop formed at each end, with the strip doubled to bring the two free ends in juxtaposition, and to form a midloop where doubled;

a buckle holding the two free ends in related adjustable position with one end loop holding the buckle and the other end loop supported by the buckle to serve as an end loop for the doubled strip as a shoulder strap;

a pair of auxiliary coupling elements for attachment to the respective opposite sides of a camera housing;

and means for coupling the supported end loop and the midloop, respectively, to the respective coupling elements of said pair.

2. A shoulder strap, as in claim 1, in which:

each of said auxiliary coupling elements embodies a strip having a loop at each end with each end loop carrying a coupling ring;

and each of said coupling means includes a snap spring clip constructed to enjoy free rotation in a complete turn, and connected between one strap loop and one coupling ring of the auxiliary element.

3. A shoulder strap, as in claim 1, in which one ring of each auxiliary coupling element and one loop of the doubled strap are joined by a clip constructed to have rotary freedom through a complete turn at one end of said clip.

4. A shoulder strap, as in claim 2, in which one ring of each auxiliary coupling element is connected to a bracket for threading into a socket on a camera frame, and the other ring of said coupling element is connected to a loop of the strap through a connection having a rotational freedom through a complete turn.